United States Patent
Ko et al.

(10) Patent No.: US 10,622,608 B2
(45) Date of Patent: Apr. 14, 2020

(54) SECONDARY BATTERY

(71) Applicant: SAMSUNG SDI CO., LTD., Yongin-si, Gyeonggi-do (KR)

(72) Inventors: Sunggwi Ko, Yongin-si (KR); Geunho Seo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 127 days.

(21) Appl. No.: 15/460,071

(22) Filed: Mar. 15, 2017

(65) Prior Publication Data

US 2017/0309880 A1 Oct. 26, 2017

(30) Foreign Application Priority Data

Apr. 22, 2016 (KR) .................. 10-2016-0049618

(51) Int. Cl.
| | | |
|---|---|---|
| H01M 2/12 | (2006.01) | |
| H01M 2/04 | (2006.01) | |
| H01M 2/34 | (2006.01) | |
| H01M 10/0525 | (2010.01) | |

(52) U.S. Cl.
CPC ......... *H01M 2/1241* (2013.01); *H01M 2/046* (2013.01); *H01M 2/0413* (2013.01); *H01M 2/0486* (2013.01); *H01M 2/345* (2013.01); *H01M 10/0525* (2013.01); *H01M 2200/20* (2013.01)

(58) Field of Classification Search
CPC ..................... H01M 2/0413; H01M 2/046
See application file for complete search history.

(56) References Cited

U.S. PATENT DOCUMENTS

| | | | |
|---|---|---|---|
| 2003/0152831 A1* | 8/2003 | Davidson | H01M 2/0413 429/174 |
| 2009/0297941 A1 | 12/2009 | Shen et al. | |
| 2011/0287288 A1* | 11/2011 | Hina | H01M 4/1391 429/94 |
| 2012/0129019 A1 | 5/2012 | Onnerud et al. | |

FOREIGN PATENT DOCUMENTS

| | | |
|---|---|---|
| KR | 10-0993645 | 11/2010 |
| KR | 10-1521158 | 5/2015 |
| KR | 10-1523064 | 5/2015 |

OTHER PUBLICATIONS

English Abstract for Patent Publication KR20080075229 (A), dated Aug. 14, 2008, corresponding to KR 10-0993645, dated Nov. 10, 2010, 1 page.

(Continued)

*Primary Examiner* — Olatunji A Godo
(74) *Attorney, Agent, or Firm* — Lewis Roca Rothgerber Christie LLP (57) ABSTRACT

A secondary battery includes: a cylindrical can; an electrode assembly accommodated in the cylindrical can with an electrolyte; and a cap assembly sealing the cylindrical can. The cap assembly includes a cap-up having a terminal portion, a bent portion downwardly bent from the terminal portion, and an extending portion outwardly extending from the bent portion. The terminal portion has a smaller thickness than the extending portion, and a top-end height of the terminal portion of the cap-up is equal to or less than that of the cylindrical can.

10 Claims, 5 Drawing Sheets

(56) References Cited

OTHER PUBLICATIONS

English Abstract for Patent Publication KR20100039853 (A), dated Apr. 16, 2010, corresponding to KR 10-1521158, dated May 18, 2015, 1 page.
English Abstract for Patent Publication KR20140106328 (A), dated Sep. 3, 2014, corresponding to KR 10-1523064, dated May 26, 2015, 1 page.

* cited by examiner

SECONDARY BATTERY

CROSS-REFERENCE TO RELATED APPLICATION

This application claims priority to and the benefit of Korean Patent Application No. 10-2016-0049618, filed on Apr. 22, 2016 in the Korean Intellectual Property Office, and all the benefits accruing therefrom under 35 U.S.C. § 119, the content of which is herein incorporated by reference in its entirety.

BACKGROUND

1. Field

Embodiments of the present invention relate to a secondary battery.

2. Description of the Related Art

Lithium ion secondary batteries are being widely used in portable electronic devices and as power sources of hybrid automobiles and electric vehicles because of various characteristics, including a relatively high operation voltage, relatively high energy density per unit weight, and so forth.

Lithium ion secondary batteries can be generally classified as cylinder-type secondary batteries, prismatic-type secondary batteries, and pouch-type secondary batteries according to a shape thereof. The cylindrical lithium ion secondary battery generally includes a cylindrical electrode assembly, a cylindrical can coupled to the electrode assembly, an electrolyte injected into the can to allow movement of lithium ions, and a cap assembly coupled to one end of the can to prevent leakage of the electrolyte and separation of the electrode assembly.

The above information disclosed in this Background section is for enhancement of understanding of the background of the described technology, and therefore, it may contain information that does not form prior art.

SUMMARY

Embodiments of the present invention provide a secondary battery.

The above and other aspects of the present invention will be described in or will be apparent from the following description of exemplary embodiments thereof.

According to an aspect of the present invention, a secondary battery includes a cylindrical can, an electrode assembly accommodated in the cylindrical can with an electrolyte, and a cap assembly sealing the cylindrical can. The cap assembly includes a cap-up having a terminal portion, a bent portion downwardly bent from the terminal portion, and an extending portion outwardly extending from the bent portion. The terminal portion has a smaller thickness than the extending portion, and a top-end height of the terminal portion of the cap-up is equal to or less than that of the cylindrical can.

The cap-up may include aluminum or an aluminum alloy.

The cap-up may include a 5000-series aluminum alloy.

The thickness of the terminal portion of the cap-up may be less than three-fourths of the thickness of the extending portion.

The cap-up may be press forged to reduce a thickness of the terminal portion.

The secondary battery may further include a safety plate including a main body under the cap-up, a main body bent portion upwardly extending from a periphery of the main body, and a main body extending portion inwardly extending from the main body bent portion and partially covering a top surface of the cap-up.

The secondary battery may further include an insulation gasket between a top end of the cylindrical can and the main body extending portion of the safety plate.

The cylindrical can may include a bottom portion, a side portion upwardly extending from the bottom portion, a crimping portion at a top end of the side portion and surrounding a periphery of the extending portion of the cap-up, and a beading portion at a lower portion of the crimping portion and recessed toward to the electrode assembly.

The secondary battery may further include a negative electrode lead tab connected to a top end of the crimping portion of the cylindrical can, and a positive electrode lead tab connected to a top end of the terminal portion of the cap-up.

The cap-up may be electrically connected to a positive electrode of the electrode assembly, and the cylindrical can may be electrically connected to a negative electrode of the electrode assembly.

As described above, a secondary battery according to embodiments of the present invention provides increased space between a cap-up and a safety plate by reducing a size (e.g., a thickness) of a terminal portion in the cap-up, thereby providing an operating space for the safety plate and a gas discharging space. Further, in the secondary battery according to embodiments of the present invention, the extending portion of the cap-up, which includes a flexible aluminum material and is formed by press forging, has a greater thickness than the terminal portion, thereby reducing or minimizing deformation of an extending portion of the cap-up which may occur after a crimping process.

BRIEF DESCRIPTION OF THE DRAWINGS

The above and other features of the present invention will become more apparent by describing, in detail, exemplary embodiments thereof with reference to the attached drawings in which.

DETAILED DESCRIPTION

Hereinafter, exemplary embodiments of the present invention will be described, in detail, with reference to the accompanying drawings such that they can easily be made and used by those skilled in the art. The present invention may, however, be embodied in many different forms and should not be construed as being limited to the embodiments set forth herein. Rather, these embodiments are provided so that this disclosure will be thorough and complete and will fully convey the concept of the present invention to those skilled in the art. The present invention will be defined by the appended claims and their equivalents.

In the drawings, thicknesses of layers and regions may be exaggerated for clarity. Like numbers refer to like elements throughout. As used herein, the term "and/or" includes any and all combinations of one or more of the associated listed items. In addition, it will be understood that when an element A is referred to as being "coupled to" or "connected to" an element B, the element A can be directly coupled or connected to the element B or an intervening element C may be present between the elements A and B so that the element A can be indirectly coupled or connected to the element B.

In addition, the terminology used herein is for the purpose of describing particular embodiments and is not intended to be limiting thereof. As used herein, the singular forms "a" and "an" are intended to include the plural forms as well, unless the context clearly indicates otherwise. It will be further understood that the terms "comprises," "includes," "comprising," and "including," when used in this specification, specify the presence of stated features, integers, steps, operations, elements, and/or components but do not preclude the presence or addition of one or more other features, integers, steps, operations, elements, components, and/or groups thereof. Further, the use of "may" when describing embodiments of the present invention relates to "one or more embodiments of the present invention." Expressions, such as "at least one of," when preceding a list of elements, modify the entire list of elements and do not modify the individual elements of the list. Also, the term "exemplary" is intended to refer to an example or illustration. As used herein, the terms "use," "using," and "used" may be considered synonymous with the terms "utilize," "utilizing," and "utilized," respectively.

It will be understood that, although the terms first, second, etc. may be used herein to describe various members, elements, regions, layers, and/or sections, these members, elements, regions, layers, and/or sections should not be limited by these terms. These terms are only used to distinguish one member, element, region, layer, and/or section from another. Thus, for example, a first member, a first element, a first region, a first layer, and/or a first section discussed below could be termed a second member, a second element, a second region, a second layer, and/or a second section without departing from the teachings.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below.

In addition, the term "separator" used herein includes a separator that may be commonly used in a liquid electrolyte battery using a liquid electrolyte having little affinity to the separator. The term "separator" used herein further includes an intrinsic solid polymer electrolyte and/or a gel solid polymer electrolyte in which an electrolyte is firmly bound to a separator such that the electrolyte and the separator should be interpreted as being the same as each other. Therefore, the meaning of the separator should be defined as having a meaning that is consistent with its meaning in the context of the present disclosure.

Figure 1A:
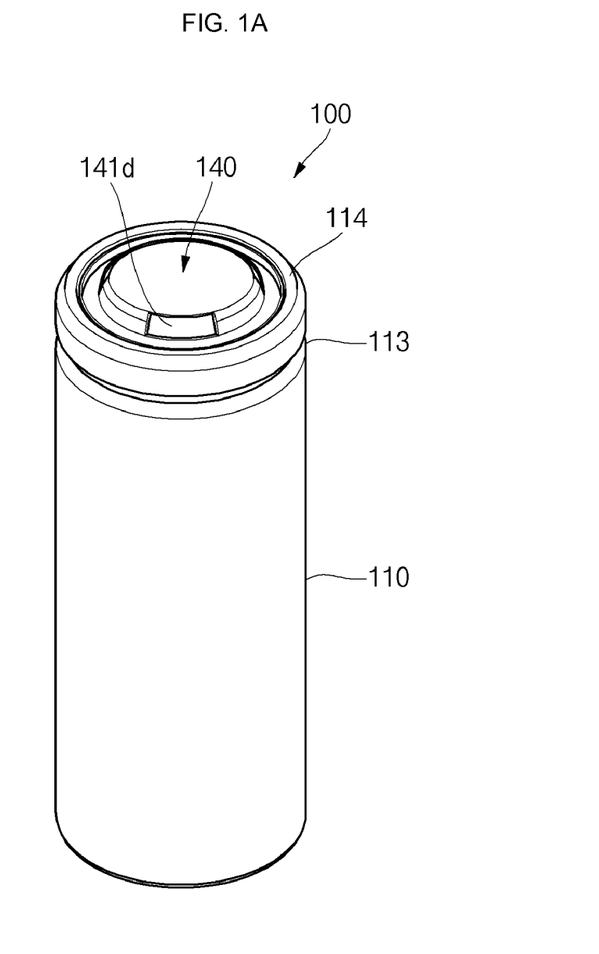
FIGS. 1A, 1B, and 1C are a perspective view, a cross-sectional view, and an exploded perspective view of a secondary battery according to embodiments of the present invention.
Figure 1B:
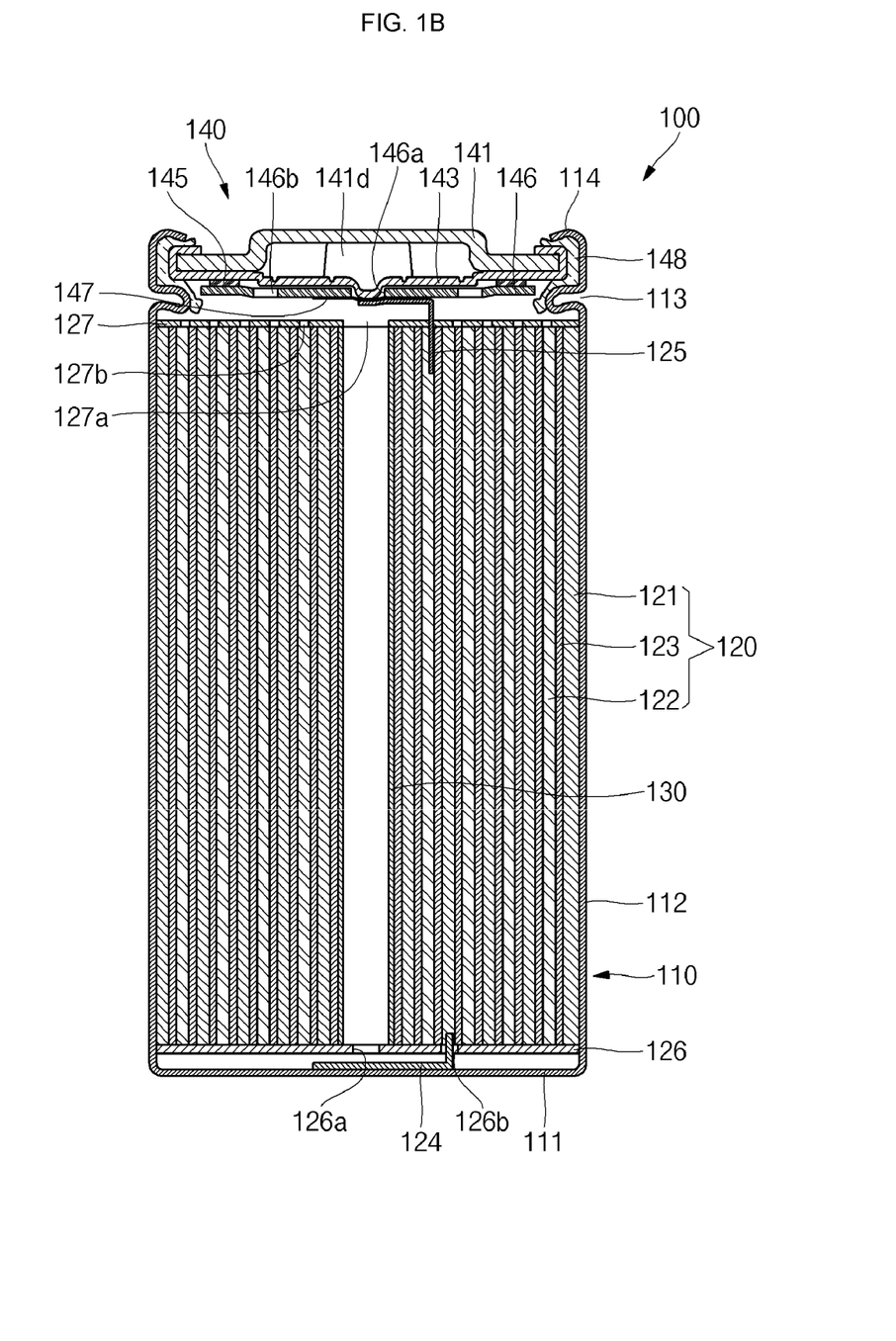
Figure 1C:
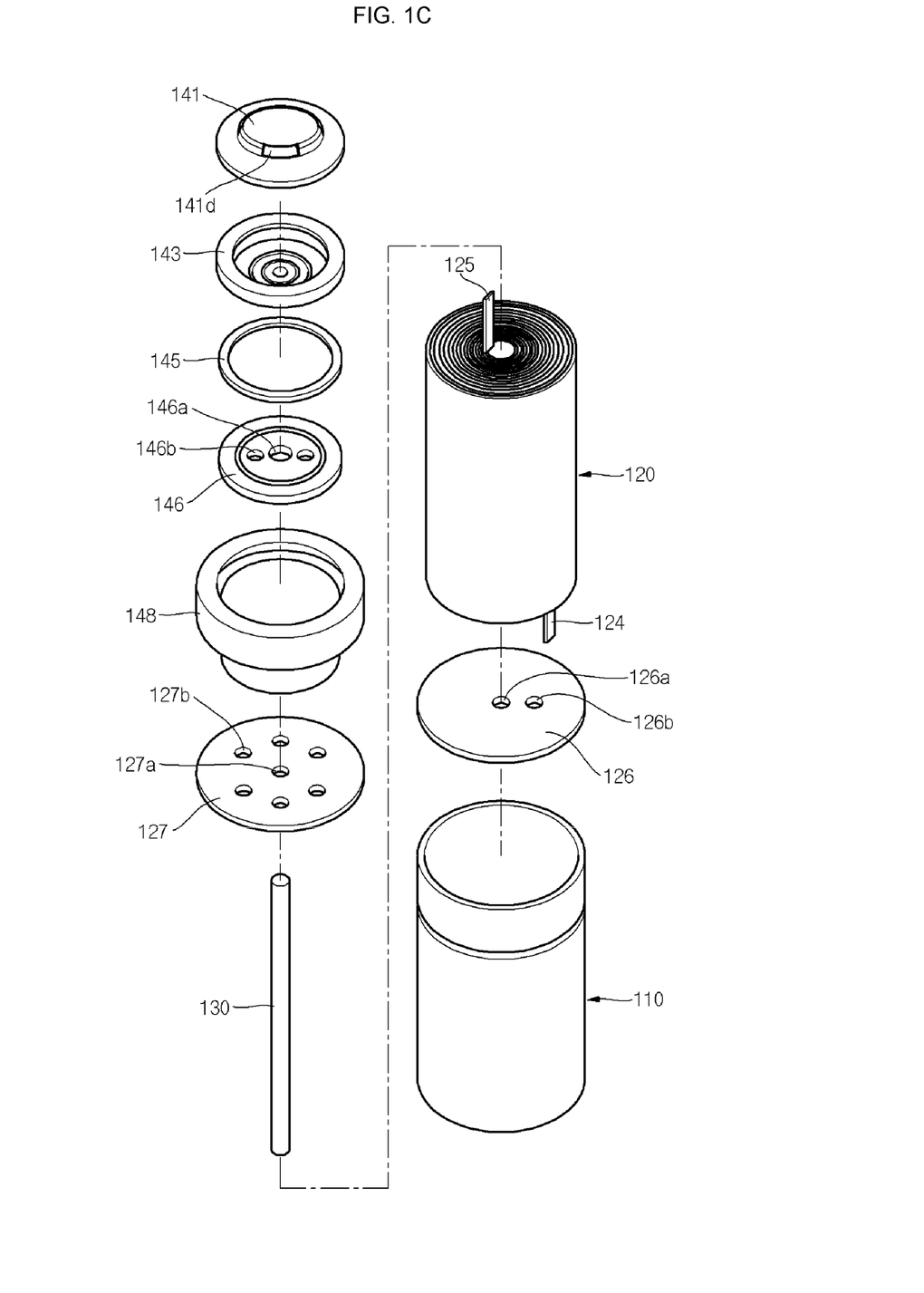

FIGS. 1A, 1B, and 1C are a perspective view, a cross-sectional view, and an exploded perspective view of a secondary battery according to embodiments of the present invention.

As illustrated in FIGS. 1A, 1B, and 1C, the secondary battery 100 according to an embodiment of the present invention includes a cylindrical can 110, an electrode assembly 120, and a cap assembly 140. In addition, the secondary battery 100 may further include a center pin 130 coupled to the electrode assembly 120.

The cylindrical can 110 includes a circular bottom portion 111 and a side portion 112 upwardly extending from (e.g., upwardly extending a certain or predetermined length from) the bottom portion 111. In the process of manufacturing the secondary battery 100 according to an embodiment of the present invention, a top portion or top end of the cylindrical can 110 is left open. Therefore, in the process of assembling the secondary battery 100 according to an embodiment of the present invention, the electrode assembly 120 may be inserted into the cylindrical can 110 together with an electrolyte. The cylindrical can 110 may be made of steel, a steel alloy, aluminum, an aluminum alloy, or an equivalent thereof, but embodiments of the present invention are not limited thereto. In addition, an inwardly recessed beading portion 113 may be formed below the cap assembly 140 to prevent the electrode assembly 120 from being separated from the cap assembly 140 and an inwardly bent crimping portion 114 may be formed on or above the beading portion 113.

The electrode assembly 120 is accommodated within the cylindrical can 110. The electrode assembly 120 includes a negative electrode plate 121 coated with a negative electrode active material (e.g., graphite or carbon), a positive electrode plate 122 coated with a positive electrode active material (e.g., a transition metal oxide, such as $LiCoO_2$, $LiNiO_2$, or $LiMn_2O_4$), and a separator 123 interposed between the negative electrode plate 121 and the positive electrode plate 122 to prevent a short circuit between the negative electrode plate 121 and the positive electrode plate 122 while allowing lithium ions to move. The negative electrode plate 121, the positive electrode plate 122, and the separator 123 are wound in a substantially cylindrical shape or configuration. In some embodiments, the negative electrode plate 121 may be formed of a copper (Cu) or nickel (Ni) foil, the positive electrode plate 122 may be formed of an aluminum (Al) foil, and the separator 123 may be made of polyethylene (PE) or polypropylene (PP); however, embodiments of the present invention are not limited thereto. In addition, a negative electrode tab 124 may be welded to the negative electrode plate 121 to downwardly protrude and extend therefrom (e.g., extend a predetermined length therefrom), and a positive electrode tab 125 may be welded to the positive electrode plate 122 to upwardly protrude and extend therefrom (e.g., extend a predetermined length therefrom), or vice versa. In addition, the negative electrode tab 124 may be made of copper or nickel, and the positive electrode tab 125 may be made of aluminum; however, embodiments of the present invention are not limited thereto.

In addition, the negative electrode tab 124 of the electrode assembly 120 may be welded to the bottom portion 111 of the cylindrical can 110. Therefore, the cylindrical can 110 may function as a negative electrode. In other embodiments, the positive electrode tab 125 may be welded to the bottom portion 111 of the cylindrical can 110. In these embodiments, the cylindrical can 110 may function as a positive electrode.

Additionally, a first insulation plate 126 may be interposed between the electrode assembly 120 and the bottom portion 111 of the cylindrical can 110 and may be coupled to the cylindrical can 110. The first insulation plate 126 has a first opening 126a (e.g., a first hole) formed at its center and a second opening 126b (e.g., a second hole) formed around the first opening 126a (e.g., the second opening 126b may be formed nearer to an edge of the first insulation plate 126 than the first opening 126a). The first insulation plate 126 may prevent the electrode assembly 120 from electrically contacting the bottom portion 111 of the cylindrical can 110. For example, the first insulation plate 126 prevents the positive electrode plate 122 of the electrode assembly 120 from electrically contacting the bottom portion 111. Further, if a relatively large amount of gas is generated due to an abnormality in the secondary battery, the first opening 126a allows the gas to rapidly move upwardly through the center pin 130, and the second opening 126b allows the negative electrode tab 124 to pass therethrough to be welded to the bottom portion 111.

In addition, a second insulation plate 127 may be interposed between the electrode assembly 120 and the cap assembly 140 and may be coupled to the cylindrical can 110. The second insulation plate 127 has a first opening 127a (e.g., a first hole) formed at its center and a second opening 127b (e.g., a second hole) formed around the first opening 127a (e.g., the second opening 127b may be formed nearer to an edge of the second insulation plate 127 than the first opening 127a). The second insulation plate 127 may prevent the electrode assembly 120 from electrically contacting the cap assembly 140. For example, the second insulation plate 127 prevents the negative electrode plate 121 of the electrode assembly 120 from electrically contacting the cap assembly 140. If a relatively large amount of gas is generated due to an abnormality in the secondary battery, the first opening 127a allows the gas to rapidly move to the cap assembly 140, and the second opening 127b allows the positive electrode tab 125 to pass therethrough to be welded to the cap assembly 140. In addition, during injection of an electrolyte, the second opening 127b allows the electrolyte to rapidly flow into the electrode assembly 120.

Because diameters of the first openings 126a and 127a of the first and second insulation plates 126 and 127 are smaller than a diameter of the center pin 130, the center pin 130 may be prevented from electrically contacting the bottom portion 111 of the cylindrical can 110 or the cap assembly 140 due to external impacts.

The center pin 130 is a hollow cylinder pipe and may be coupled to an approximately central area of the electrode assembly 120. The center pin 130 may be made of steel, a steel alloy, aluminum, an aluminum alloy, or polybutylene terephthalate; however, embodiments of the present invention are not limited thereto. The center pin 130 may suppress deformation of the electrode assembly 120 during charging and discharging of the secondary battery and may function as a movement passage for gas generated in the secondary battery. In some embodiments, the center pin 130 may not be included.

The cap assembly 140 includes a cap-up 141 having a plurality of openings 141d (e.g., through-holes), a safety plate 143 installed under the cap-up 141, a connection ring 145 installed under the safety plate 143, a cap-down 146 coupled to the connection ring 145 and having first and second openings 146a and 146b (e.g., first and second through-holes), a sub-plate 147 fixed to a lower portion of the cap-down 146 and electrically connected to the positive electrode tab 125, and an insulation gasket 148 insulating the cap-up 141, the safety plate 143, the connection ring 145, and the cap-down 146 from the side portion 112 of the cylindrical can 110.

In some embodiments, the insulation gasket 148 is pressed substantially between the beading portion 113 and the crimping portion 114, each of which are formed at the side portion 112 of the cylindrical can 110. In addition, the openings 141d formed in the cap-up 141 and the second opening 146b formed in the cap-down 146 may allow internal gas generated in the cylindrical can 110 to be discharged to the outside when an abnormal internal pressure is reached. In this case, the safety plate 143 upwardly inverts due to the internal pressure to be electrically separated from (e.g., electrically disconnected from) the sub-plate 147 and is then broken or ruptured to allow the internal gas to be discharged to the outside.

Additionally, the electrolyte is injected into the cylindrical can 110, and lithium ions generated by a electrochemical reaction in the negative electrode plate 121 and the positive electrode plate 122 in the secondary battery during charging and discharging are allowed to move. The electrolyte may be a non-aqueous, organic electrolyte including a mixture of a lithium salt and a high-purity organic solvent. In addition, the electrolyte may be a polymer using a polymer electrolyte or a solid electrolyte. However, embodiments of the present invention are not limited thereto.

In the secondary battery 100 according to embodiments of the present invention, a top-end height of the cap assembly 140 may be equal to or less than that of the cylindrical can 110. For example, a height from the bottom portion 111 of the cylindrical can 110 to the top end of the cap-up 141 of the cap assembly 140 may be equal to or less than a height from the bottom portion 111 of the cylindrical can 110 to the top end of the crimping portion 114. Therefore, the secondary battery 100 according to embodiments of the present invention can accommodate a larger electrode assembly 120 than a conventional secondary battery while having the same height as the conventional secondary battery, thereby providing a secondary battery having a relatively large capacity.

In addition, the negative electrode lead tab (150 of FIG. 2) and the positive electrode lead tab (160 of FIG. 2) may be welded to an approximately top portion of the secondary battery 100 according to embodiments of the present invention. For example, the negative electrode lead tab 150 may be electrically connected to a top end of the cylindrical can 110, for example, a top end of the crimping portion 114, and the positive electrode lead tab 160 may be electrically connected to a top end of the cap assembly 140, for example, a top end of the cap-up 141.

Figure 2:
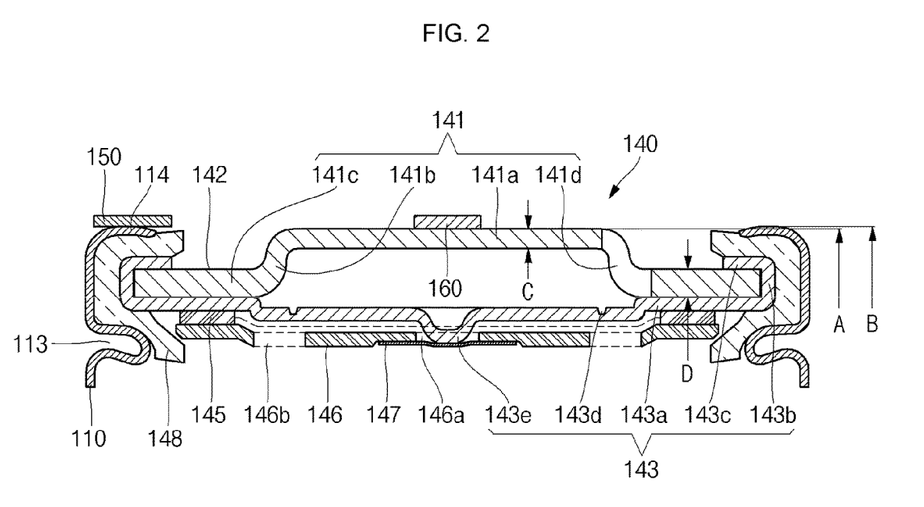
FIG. 2 is an enlarged cross-sectional view illustrating a connection structure of a cylindrical can and a cap assembly in the secondary battery according to embodiments of the present invention.

Accordingly, because the negative electrode lead tab 150 and the positive electrode lead tab 160 are both welded to the top portion of the secondary battery 100, a separately provided wire structure is not needed at a lower portion of the secondary battery 100 according to embodiments of the present invention. Therefore, a module structure of the lower portion of the secondary battery 100 can be simplified, thereby allowing the secondary battery 100 according to embodiments of the present invention to be conveniently used as a power source of an electric vehicle.

Referring to FIG. 2, a cross-sectional view illustrating the connection structure of the cylindrical can 110 and the cap assembly 140 in the secondary battery 100 according to embodiments of the present invention is illustrated. In FIG.

2, a state in which the negative electrode lead tab 150 is connected to the cylindrical can 110 is illustrated.

Assuming that the height from the bottom portion 111 of the cylindrical can 110 to the top end of the cap assembly 140 (e.g., the top end of the cap-up 141) is a first height (A) and the height from the bottom portion 111 of the cylindrical can 110 to the top end of the cylindrical can 110 (e.g., the top end of the crimping portion 114) is a second height (B), the relationship in which the first height is equal to or less than the second height (A≤B) may be satisfied. With this configuration, the negative electrode lead tab 150 may be welded to the crimping portion 114 and the positive electrode lead tab 160 may be welded to the cap-up 141.

Next, a configuration of the cap assembly 140 will be described in more detail.

The cap-up 141 of the cap assembly 140 includes a terminal portion 141a, a bent portion 141b, and an extending portion 141c. The terminal portion 141a is substantially planar and is connected a positive electrode lead tab. The bent portion 141b is formed to be downwardly bent from a periphery of the terminal portion 141a and includes one or more openings 141d (e.g., at least one through-hole). In addition, the extending portion 141c may horizontally extend outwardly from a bottom end of the bent portion 141b.

A first thickness C of the terminal portion 141a (e.g., a distance from a top surface to a bottom surface of the terminal portion 141a) of the cap-up 141 may be less than a second thickness D of the extending portion 141c (e.g., a distance from a top surface to a bottom surface of the extending portion 141c) of the cap-up 141. For example, in the cap-up 141, the first thickness C is smaller than the second thickness D, thereby increasing a space between the cap-up 141 and the safety plate 143.

In the cap-up 141, the first thickness C (e.g., only the first thickness C) of the terminal portion 141a may be reduced by press forging. To this end, the cap-up 141 may be made of a material having good formability, such as aluminum or an aluminum alloy. In some embodiments, the aluminum alloy may be a 5000-series alloy, which is light in weight, includes magnesium, and has good corrosion resistance and superior formability, as a main component.

Table 1 shows proportions (%) of various components of representative 5000-series aluminum alloys. In Table 1, the 5000-series aluminum alloys are described by proportions of metals other than aluminum (Al), and the remainder corresponds to a proportion of aluminum in each of the 5000-series aluminum alloys.

TABLE 1

| Alloy No. Number | Si | Fe | Cu | Mn | Mg | Cr | Zn | Ti |
|---|---|---|---|---|---|---|---|---|
| 5005 | 0.3 | 0.7 | 0.2 | 0.2 | 0.5-1.1 | 0.1 | 0.25 | — |
| 5052 | 0.25 | 0.4 | 0.1 | 0.1 | 2.2-2.8 | 0.15-0.35 | 0.1 | — |
| 5082 | 0.20 | 0.35 | 0.15 | 0.15 | 4.0-5.0 | 0.15 | 0.25 | 0.10 |
| 5083 | 0.40 | 0.40 | 0.10 | 0.40~1.0 | 4.0-4.9 | 0.05-0.25 | 0.25 | 0.15 |
| 5086 | 0.40 | 0.50 | 0.10 | 0.20-0.7 | 3.5-4.5 | 0.05-0.25 | 0.25 | 0.15 |
| 5154 | | 0.45 | 0.1 | 0.1 | 3.1-3.9 | 0.15-0.35 | 0.2 | — |
| 5182 | 0.2 | 0.35 | 0.15 | 0.2-0.5 | 4.0-5.0 | 0.1 | 0.25 | — |
| 5254 | | 0.45 | 0.05 | 0.01 | 3.1-3.9 | 0.15-0.35 | 0.2 | — |
| 5454 | 0.25 | 0.4 | 0.1 | 0.5-1.0 | 2.4-3.0 | 0.05-0.20 | 0.25 | 0.2 |
| 5652 | | 0.4 | 0.04 | 0.01 | 2.2-2.8 | 0.15-0.35 | 0.1 | — |

In the secondary battery 100 according to embodiments of the present invention, the negative electrode lead tab is welded to the crimping portion 114 and the positive electrode lead tab is welded to the cap-up 141, thereby reducing the first height A such that the first height A is equal to or less than the second height B. In these embodiments, as the distance between the cap-up 141 and the safety plate 143 is reduced, it may become difficult to obtain a space in which the safety plate 143 can operate. To provide a space in which the safety plate 143 can operate, the first thickness C, which is a thickness of the terminal portion 141a of the cap-up 141, may be reduced. However, if the second thickness D is reduced together with the first thickness C of the cap-up 141, which is made of a flexible aluminum alloy, the extending portion 141c may be deformed by or during a crimping process that is performed such that a top end of the cylindrical can 110 surrounds a periphery of the extending portion 141c.

Therefore, the second thickness D may be greater than the first thickness C, and the first thickness C may be smaller than the second thickness D. For example, the cap-up 141 is subjected to press forging to reduce the first thickness C (e.g., to reduce only the first thickness C) of the terminal portion 141a so as to be equal to or less than about three-fourths (¾) of the second thickness D. Accordingly, in the secondary battery 100 according to embodiments of the present invention, the space between the cap-up 141 and the safety plate 143 is increased to provide an operating space for the safety plate 143 in which the safety plate 143 can operate and a gas discharge space. In addition, the secondary battery 100 according to embodiments of the present invention can reduce or minimize deformation of the extending portion 141c, which may occur after the crimping process for forming the crimping portion 114 for coupling the cylindrical can 110 and the cap assembly 140 to each other.

Figure 3:
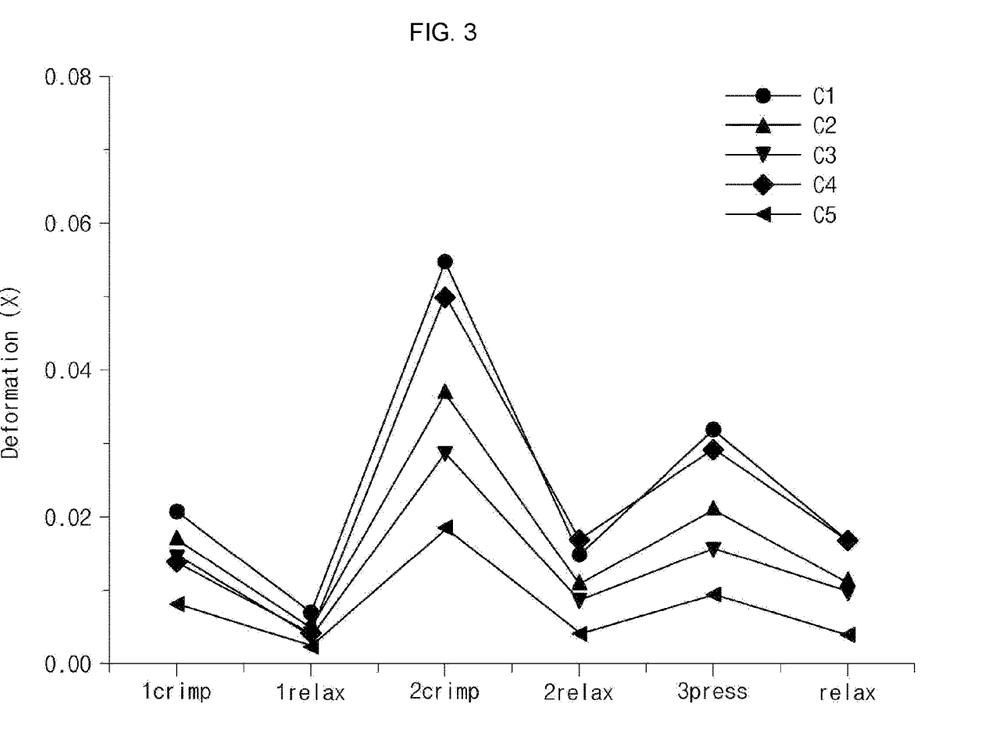
FIG. 3 is a graph illustrating experimental data of deformation of an extending portion of a cap-up at various steps of a crimping process for manufacturing a secondary battery according to embodiments of the present invention.
Figure 4:
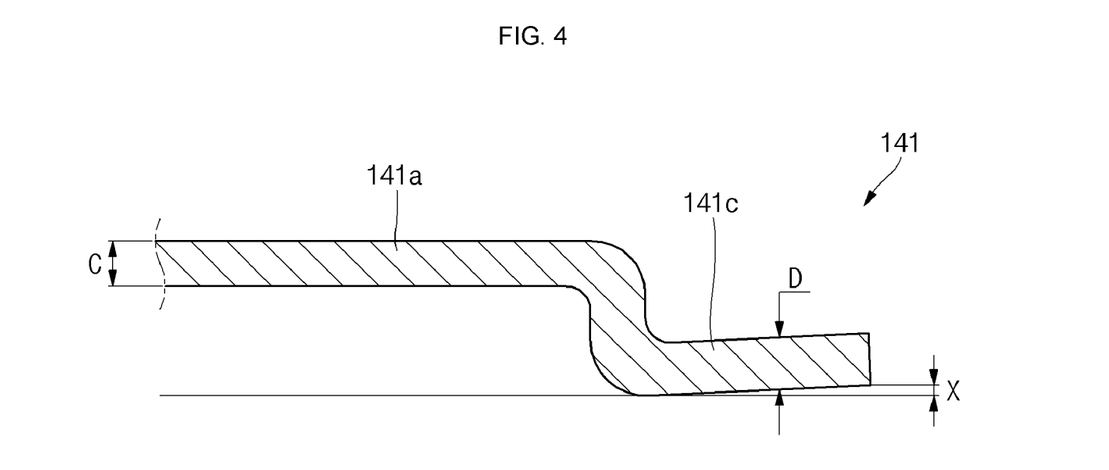
FIG. 4 is a partially enlarged cross-sectional view of a cap-up illustrating the deformation of FIG. 3.

Referring to FIG. 3, experimental data of deformation (X) of the extending portion 141c measured at various steps of the crimping process is shown. In FIG. 3, the deformation (X) indicates a deformation amount of the extending portion 141c as measured at various steps of the crimping process. FIG. 4 illustrates a partially enlarged view of the cap-up 141.

Table 2 shows the material, the first thickness C, and the second thickness D of the cap-up 141 of the Experimental Examples illustrated in FIG. 3. Here, SPCE (Steel Plate Cold deep drawn Extra) is a cold rolled steel sheet that is generally used to form a cap-up made of steel, and Al5052 is an aluminum alloy corresponding to alloy number 5052, as shown in Table 2. In addition, while experiments were carried out using the alloy number 5052 as the material of the cap-up 141, aluminum alloys other than the alloy number 5052 may also be used, and embodiments of the present invention are not limited to Al5052. Here, the thicknesses of the terminal portion and the extending portion are indicated in millimeters.

TABLE 2

| | Material | Thickness of terminal portion (C) | Thickness of extending portion (D) |
|---|---|---|---|
| Experimental Example 1 (C1) | Al5052 | 0.6 | 0.7 |
| Experimental Example 2 (C2) | Al5052 | 0.6 | 0.8 |
| Experimental Example 3 (C3) | Al5052 | 0.6 | 0.9 |
| Experimental Example 4 (C4) | SPCE | 0.6 | 0.6 |
| Experimental Example 5 (C5) | SPCE | 0.8 | 0.8 |

In FIG. 3, 1crimp indicates a crimping process performed one time, 1relax indicates a relaxing period after performing the crimping process one time, 2crimp indicates the crimping process performed two times, 2relax indicates a relaxing period after performing the crimping process two times, 3press indicates a pressing process performed in the crimping process, and relax indicates a final relaxing period after the crimping process is completely finished.

As shown in FIG. 3 and Table 1, Experimental Example 1 (C1), Experimental Example 2 (C2), and Experimental Example 3 (C3) correspond to data of cap-up members made of an aluminum alloy, and Experimental Example 4 (C4) and Experimental Example 5 (C5) correspond to data of cap-up members made of steel. When the cap-up is made of an aluminum alloy, the deformation (X) is reduced as the thickness of the extending portion increases. In addition, when the cap-up is made of steel, the deformation (X) is reduced as the thickness of the extending portion increases. For example, as the thickness of the extending portion increases, the deformation (X) is reduced after the crimping process is completely finished. In addition, when a flexible aluminum alloy is used as the press-forged terminal portion 141a of the cap-up 141, and the thickness of the extending portion 141c was increased compared to that of the terminal portion 141a, the deformation was lower when compared to a case when the cap-up is made of steel.

For example, the cap-up 141 made of an aluminum alloy may be subjected to press forging to reduce the thickness of the terminal portion 141a while an increase in the deformation after the crimping process may be avoided.

The safety plate 143 of the cap assembly 140 includes a main body 143a, a main body bent portion 143b, and a main body extending portion 143c. The main body 143a is generally positioned under the cap-up 141 and includes a plurality of vent grooves 143d formed on its surface and a lower protrusion 143e downwardly protruding at an approximately central region of the main body 143a to be connected to a sub-plate 147. The main body bent portion 143b is upwardly bent from the periphery of the main body 143a and surrounds the periphery of the extending portion 141c of the cap-up 141. In addition, the main body extending portion 143c horizontally extends inwardly from the main body bent portion 143b to cover a top surface of the extending portion 141c of the cap-up 141. For example, the main body extending portion 143c of the safety plate 143 covers a region (e.g., a periphery) of the top surface of the extending portion 141c of the cap-up 141.

Additionally, the insulation gasket 148 may be positioned at an exterior side of the safety plate 143. For example, the insulation gasket 148 may be interposed between an exterior side of the safety plate 143 and the cylindrical can 110. In some embodiments, the insulation gasket 148 may be pressed and interposed between the beading portion 113 and the crimping portion 114 of the cylindrical can 110 so as to surround the exterior side of the safety plate 143.

While a secondary battery has been particularly shown and described with reference to exemplary embodiments of the present invention, it will be understood by those of ordinary skill in the art that various changes in form and details may be made therein without departing from the spirit and scope of the present invention as defined by the following claims and their equivalents.

What is claimed is:

1. A secondary battery comprising:
a cylindrical can;
an electrode assembly accommodated in the cylindrical can with an electrolyte; and
a cap assembly sealing the cylindrical can, the cap assembly comprising a cap-up having a terminal portion, a bent portion downwardly bent from the terminal portion, and an extending portion bent from and outwardly extending from the bent portion, the terminal portion having a smaller thickness than the extending portion,
wherein a top-end height of the terminal portion of the cap-up is less than a top-end height of the cylindrical can.

2. The secondary battery of claim 1, wherein the cap-up comprises aluminum or an aluminum alloy.

3. The secondary battery of claim 2, wherein the cap-up comprises a 5000-series aluminum alloy.

4. The secondary battery of claim 1, wherein the thickness of the terminal portion is less than about three-fourths of the thickness of the extending portion.

5. The secondary battery of claim 1, wherein the cap-up is press forged to reduce the thickness of the terminal portion.

6. The secondary battery of claim 1, further comprising a safety plate comprising a main body under the cap-up, a main body bent portion upwardly extending from a periphery of the main body, and a main body extending portion inwardly extending from the main body bent portion and partially covering a top surface of the cap-up.

7. The secondary battery of claim 6, further comprising an insulation gasket between a top end of the cylindrical can and the main body extending portion of the safety plate.

8. The secondary battery of claim 1, wherein the cylindrical can comprises a bottom portion, a side portion upwardly extending from the bottom portion, a crimping portion at a top end of the side portion and surrounding a periphery of the extending portion of the cap-up, and a beading portion at a lower portion of the crimping portion and recessed toward the electrode assembly.

9. The secondary battery of claim 8, further comprising:
a negative electrode lead tab connected to a top end of the crimping portion of the cylindrical can; and
a positive electrode lead tab connected to a top end of the terminal portion of the cap-up.

10. The secondary battery of claim 9, wherein the cap-up is electrically connected to a positive electrode of the electrode assembly, and the cylindrical can is electrically connected to a negative electrode of the electrode assembly.

* * * * *